Aug. 23, 1927.
D. A. MAANUM
1,639,853
VALVE FOR MILK VATS
Filed July 23, 1926   2 Sheets-Sheet 1
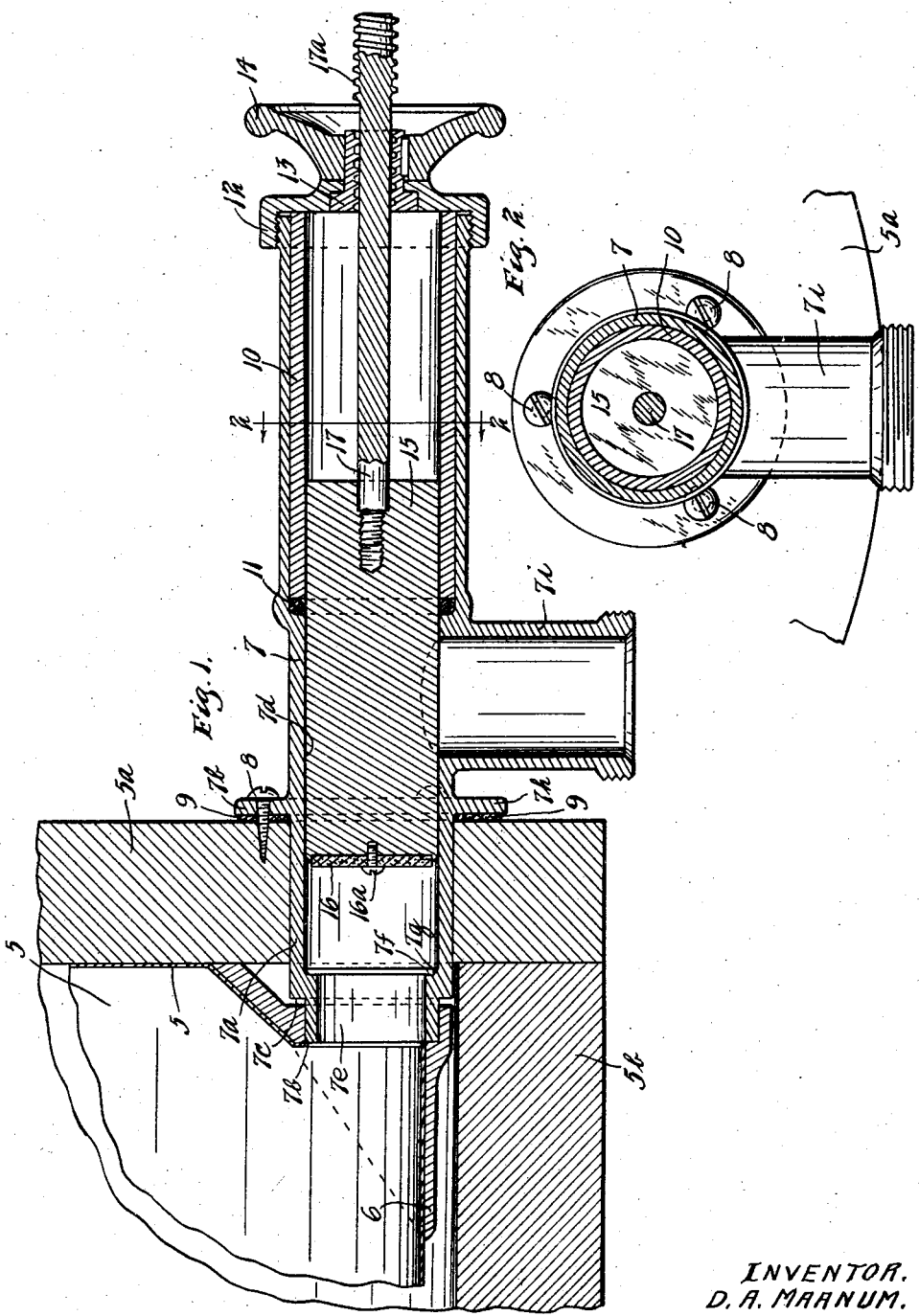
INVENTOR.
D. A. MAANUM.
BY HIS ATTORNEYS.

Aug. 23, 1927.

D. A. MAANUM 1,639,853

VALVE FOR MILK VATS

Filed July 23, 1926

INVENTOR.
D. A. MAANUM.
BY HIS ATTORNEYS

UNITED STATES PATENT OFFICE.

DEDRICK A. MAANUM, OF MINNEAPOLIS, MINNESOTA, ASSIGNOR OF ONE-FOURTH TO ANTON A. MAANUM AND ONE-FOURTH TO THOR A. MAANUM, BOTH OF MINNEAPOLIS, MINNESOTA.

VALVE FOR MILK VATS.

Application filed July 23, 1926. Serial No. 124,378.

This invention relates to a valve and while the valve is applicable to various devices, it particularly is designed for use with vats or containers adapted to contain milk or cream. Such vats are now commonly used in dairy establishments of various kinds. The structure of such valves must conform to specifications and regulations established by the State. Some of the common requirements are that the valve should contain no recesses in which the milk or cream can lodge and become unsanitary, and that the shut-off point for the milk or cream be substantially alined with or within the wall of the container or vat.

It is an object of this invention, therefore, to provide a valve having no recesses or corners therein, in the passage for the fluid therethrough, which might collect the milk or cream.

It is a further object of the invention to provide a valve having a passage leading from the container and having a shut-off point or plane disposed substantially in line with the wall of the vat.

It is still another object of the invention to provide a valve having a body portion adapted to be secured to the wall of the vat and having a portion extending into said wall, said body portion having a bore, and the portion extending into the vat having a reduced passage communicating with the vat forming a shoulder in said bore, together with a plunger fitting said bore and having a face adapted to seat against said shoulder, said bore having a lateral outlet opening extending therefrom adapted to be covered by said plunger.

It is still another object of the invention to provide such a valve as set forth in the preceding paragraph, in which means are provided for advancing and retracting said plunger to close and open the valve respectively, which means may include a stem having a threaded portion at its outer end and a longitudinally stationary but revoluble nut engaging said threaded portion for partially retracting said plunger whereby said stem may be grasped and the plunger quickly retracted or advanced by hand.

These and other objects and advantages of the invention will be fully set forth in the following description made in connection with the accompanying drawings, in which like reference characters refer to similar parts throughout the several views and in which:—

Fig. 1 is a central vertical section through the valve and a portion of the vat, with which it is connected;

Fig. 2 is a vertical section taken on line 2—2 of Fig. 1 as indicated by the arrows.

Figure 3:
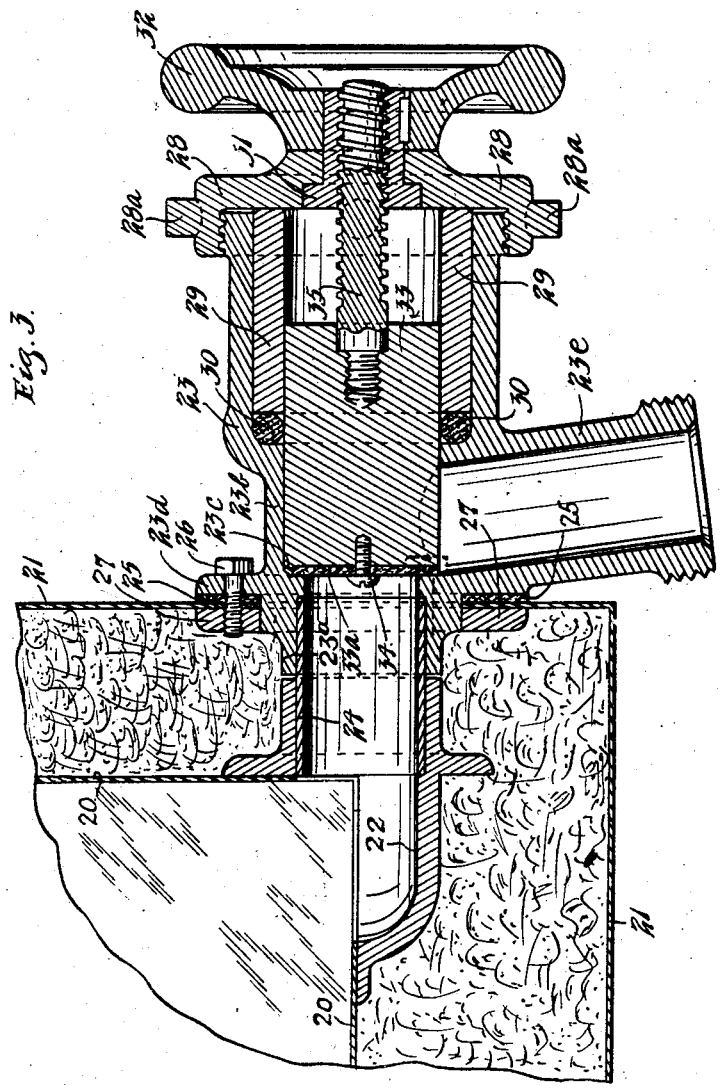
Fig. 3 is a view similar to Fig. 1, showing a modified form of valve.

Referring to the drawings, particularly Figs. 1 and 2, a vat or container for milk or cream is illustrated as 5, the same having a side wall $5^a$ and the bottom portion $5^b$. The container is also shown as having a lining, which lining at one corner is engaged by an outlet member 6. The valve has a body 7 having a portion $7^a$ adapted to extend into the wall $5^a$ through an opening therein and the same is shown as having a reduced end $7^b$ extending into the opening in the member 6. The end of the portion $7^b$ is fitted very tightly against the end of the opening in the member 6 and in order that this portion may engage the member 6 the shoulder $7^c$ formed between portions $7^b$ and $7^a$ is spaced from the member 6. The body 7 has an elongated bore $7^d$ extending therethrough which bore extends into the portion $7^a$ and said portion and portion $7^b$ have a reduced passage $7^e$ extending to the end thereof and communicating with the interior of the vat or container 5. The passage $7^e$ forms a shoulder $7^f$ at its outer end which joins the wall of the bore $7^d$ preferably by the inclined surface $7^g$. The body 7 has a flange $7^h$ adapted to fit against the outer side of the wall $5^a$ and to be secured thereto by suitable screws 8 extending through holes in said flange, a gasket 9 preferably being disposed between the outer side of the wall and flange $7^h$. The body 7 has a downwardly or laterally projecting arm or nipple $7^i$ having an outlet opening therethrough communicating with the bore $7^d$, which arm is threaded at its lower end for receiving any suitable connection. The body 7 has an enlarged bore at its outer end in which is disposed the sleeve 10 having a bore of the same diameter as the bore $7^d$. A packing ring 11 of suitable packing material preferably rubber is disposed between the inner end of the sleeve 10 and the shoulder formed between the bores in the body 7. The outer end of the body 7 is threaded to receive a cap member 12 extending across the end of said body and engaging the sleeve 10, which cap member forces the sleeve inwardly against the packing 11. The cap member has a cylindrical and shouldered recess in which is disposed the inner end of the nut 13, said nut having an enlarged head at its inner side fitting in said recess and having its outer end projecting outward of cap 12. The hand wheel 14 is keyed to the nut 13 so as to turn the same, it being noted that said nut will thus be held from longitudinal movement. A plunger 15 is provided of cylindrical form and snugly fitting in the bores 7$^b$ and that of sleeve 10, which plunger has on its front end or face a disk 16 of some soft metal, such as tin, which disk is held in place by the central screw 16$^a$ threaded into the end of said plunger. The plunger at its outer end has secured therein the threaded end of the stem 17, which stem extends outward through the nut 13, said stem being smooth for the greater part of its length, but having threads 17$^a$ formed for a short distance at the outer end thereof, adapted to co-operate with the threads formed on the interior of the nut 13.

In operation, when the valve is to be closed, the outer end of stem 17 will be engaged manually and pushed inwardly until the inner end of the threads 17$^a$ will be engaged by the nut 13. The hand wheel 14 will then be turned and the nut will engage threads 17$^a$ and move the plunger forward inwardly until the disk 16 will engage the shoulder 7$^f$ when the valve will be tightly closed. It will be noted that the plane of the shoulder 7$^f$ is substantially alined with the inner wall of the vat 5$^a$. The vat is thus closed by a flat surface and there will be no milk or cream outside of the plane of the shoulder 7$^f$ and the milk or cream in the vat has free access to that in the passage 7$^e$. This is in strict accordance with the requirements now made in many States. It will be noted that the outlet through the portion 7$^i$ is also closed by the plunger when the passage 7$^e$ is closed. When the valve is to be opened, the hand wheel 14 will be turned in a reverse direction. This will move stem 17 and plunger 15 outwardly until the threads 17$^a$ move out of the nut 13. The stem can then be engaged manually and the valve 15 pulled quickly outwardly. The valve can thus be operated much more quickly than if it were moved all the way by the screw threads. The sleeve 10 and packing 11 are provided to positively insure that no milk or cream can ever find its way to the outer end of the body 7. However, the fit of the plunger 15 in the bore of the valve is quite close and no appreciable amount of milk or cream can pass the plunger.

In the modification shown in Fig. 3 a vat is shown having an inner wall 20 and an outer wall 21 between which insulation will be placed. The vat has an outlet member 22 disposed at one corner thereof having an outlet passage therethrough. The valve has a body 23 having a portion 23$^a$ extending into the wall of the vat or into the space between the walls 20 and 21. The ends of member 22 and of portion 23$^a$ are in close relation and said members have bores of the same diameter therein in which a bushing or sleeve 24 is disposed. This sleeve will be sweated into both members and will closely abut or fit against the end of the bore in the member 23$^a$ as shown. The body 23 has a bore 23$^b$ therein of larger diameter than the passage through member 23$^a$ and forming therewith the shoulder 23$^c$. The body 23 has a flange 23$^d$ thereon adapted to fit flat against the outer side of the vat or wall 21 and a gasket 25 preferably being inserted between the flange 23$^d$ and wall 21. The valve is held in position by the bolts 26 passing through the flange 23$^d$, the wall 21 and the collar 29 fitting over the portion 23$^a$ and engaging the inner side of wall 21. The body 23 has a downwardly or laterally projecting arm 23$^e$ having a passage therethrough communicating with the bore 23$^b$, the outer end of arm 23$^e$ being exteriorly threaded to receive any suitable connection. The outer end of body 23 is threaded to receive a cap member 28 and said body portion has an enlarged bore in its outer end in which fits the sleeve 29, the outer end of which is engaged by the cap 28, whereby said sleeve is forced inwardly against a packing ring 30 preferably of rubber disposed against the shoulder between the two bores in the body 23. The cap 28 has an outer portion 28$^a$ which may be made of hexagonal shape for convenience in turning said cap. The sleeve 29 has a bore therein of the same diameter as the bore 23$^b$. The cap 28 has a central opening with an enlarged recess at its inner side in which is disposed a nut 31 having an enlarged diameter or head at its inner side seated in the recess in cap 28, the said nut projecting outwardly from said cap. The nut 31 has a hand wheel 32 keyed thereto whereby said nut may be turned. An elongated plunger 33 fits in and is slidable in the bore 23$^b$ and the bore of sleeve 29, said plunger having a disk 33 of some soft metal such as tin seated in its inner face and held in place therein by the central screw 34 threaded into the inner end of said plunger. The plunger 33 has a stem 35 threaded into its outer end which stem is exteriorly threaded and projects through and engages the threads on the inner side of nut 31.

In operation, when the valve is to be closed, the wheel 32 will be turned and will in turn rotate nut 31. The nut is held from longitudinal movement and stem 35 is thus progressed with the plunger 33. The plunger 33 will be moved inwardly and the disk 35 will engage the shoulder 23ᵉ, thus closing the passage in member 24. It will be noted that the plane of the shoulder 23ᵉ is substantially in line with the outer surface of the wall 21 and this shoulder may be located further inwardly if desired. The vat is thus closed by a plane wall and there will be no milk or cream outside of the plane of said wall. The milk or cream in the member 22 and member 24 is in direct communication with that in the vat. The plunger 33 also closes the outlet through arm 23ᵉ. The valve may be opened by turning wheel 32 in the opposite direction when stem 35 will withdraw the plunger 33. The threads on the stem 35 and the nut 31 preferably are left handed.

From the above description it is seen that applicant has provided a very simple and efficient structure of valve, particularly adapted for a vat or container for milk or cream. The closure is easily and positively made and there are no recesses or corners in which the milk or cream may lodge and thus become unsanitary. The structure of the valve is quite simple and the parts are easily made and assembled. The valve can also be easily and readily cleaned and there are no recesses or corners difficult of access. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:

1. A valve for a milk vat or other container having a body with means for attachment to said vat, said body portion having an elongated bore with a shoulder therein substantially alined with the wall of said vat, a passage extending from said bore into said vat, said body having an outlet opening at one side of said bore, a plunger movable in said bore over said opening and against said shoulder, a stem secured to said plunger having a smooth portion and threaded at the outer end thereof, a revoluble nut at the outer end of said body through which said stem projects, and means for turning said nut to move said threaded portion therethrough whereby said stem may then be engaged manually and said plunger manually moved.

2. A valve for a milk vat or other container having a body with means for attachment to said vat, said body portion having an elongated bore with a shoulder therein substantially alined with the wall of said vat, a passage extending from said bore into said vat, said body having an outlet opening at one side of said bore, a cap threaded on the outer end of said body, a nut revolubly mounted in said cap and held from longitudinal movement therein, a plunger movable in said bore adapted to engage said shoulder and move over said outlet opening, a stem projecting from the outer end of said plunger and extending through said nut and a hand wheel secured to said nut for turning the same and moving said plunger.

3. A valve for a milk vat or other container having a body with means for attachment to said vat, said body portion having an elongated bore with a shoulder therein substantially alined with the wall of said vat, a passage extending from said bore into said vat, said body having an enlarged bore at its outer end forming a shoulder at its inner end, a cap threaded on the outer end of said body, a sleeve fitting in said enlarged bore and having its outer end engaged by said cap, a packing surrounding said plunger and engaging said last mentioned shoulder and engaged by the inner end of said sleeve, said sleeve having a bore of the same diameter as said first mentioned bore, a cylindrical plunger movable in said first mentioned bore and sleeve and means at the outer end of said body for non-rotatably advancing and retracting said plunger.

4. A valve for a milk vat or similar container comprising a body adapted to be secured to the wall of said container and having a portion extending into said wall, said body portion having an elongated bore extending into said portion, said bore having a reduced passage extending into the container having its bottom flush with the bottom of said container and forming a shoulder in said bore, a plunger fitting and movable in said bore and having a face portion adapted to engage said shoulder and close the passage from said container, means connected to one end of said plunger for non-rotatably moving said plunger to engage said shoulder, said valve having an outlet opening extending from one side of said body and bore, over which said plunger moves and which is opened or closed by said plunger, and means for packing said plunger between said outlet opening and the outer end of said bore.

5. A valve for a milk or other vat having a wall comprising a body portion extending into said wall, said body having means for attachment to the outer side of said wall and having a bore therein extending into said portion, said portion having a reduced passage extending into said container and forming a shoulder in said bore alined substantially with the inner wall of said vat, an elongated plunger movable in said bore having a seating face at its inner end adapted to engage said shoulder, said valve having an outlet opening at one side of said body and bore over which said plunger moves, said body portion having a circumferential shoulder between said outlet opening and the outer end of said bore, a packing engaging said shoulder and surrounding said plunger, a sleeve in said bore engaging said packing, and a cap secured to the outer end of said body engaging the end of said sleeve to force the same against said packing, revoluble means in said cap, and means secured to the outer end of said plunger engaged by said revoluble means for non-rotatably advancing and retracting said plunger.

6. A valve for a milk or other vat having a wall comprising a body portion extending into said wall, said body having means for attachment to the outer side of said wall and having a bore therein extending into said portion, said portion having a reduced passage extending into said container and forming a shoulder in said bore alined substantially with the inner wall of said vat, an elongated plunger movable in said bore having a seating face at its inner end adapted to engage said shoulder, said valve having an outlet opening at one side of said body and bore over which said plunger moves, said body portion having a circumferential shoulder between said outlet opening and the outer end of said bore, a packing engaging said shoulder and surrounding said plunger, a sleeve in said bore engaging said packing, a cap threaded on the outer end of said body, a nut revolubly mounted in said cap, a revoluble hand wheel secured to said nut and a threaded stem secured to said plunger and extending through said nut, whereby said plunger may be advanced and retracted.

In testimony whereof I affix my signature.

DEDRICK A. MAANUM.